(12) United States Patent
Nagayama

(10) Patent No.: US 7,806,499 B2
(45) Date of Patent: Oct. 5, 2010

(54) COMPLEX POINTILLISTIC PRINTING

(75) Inventor: Kuniaki Nagayama, Okazaki (JP)

(73) Assignee: Nagayama IP Holdings LLC, Okazaki (JP)

( * ) Notice: Subject to any disclaimer, the term of this patent is extended or adjusted under 35 U.S.C. 154(b) by 699 days.

(21) Appl. No.: 10/586,750

(22) PCT Filed: Feb. 7, 2005

(86) PCT No.: PCT/US2005/003775

§ 371 (c)(1),
(2), (4) Date: Aug. 1, 2007

(87) PCT Pub. No.: WO2005/076983

PCT Pub. Date: Aug. 25, 2005

(65) Prior Publication Data

US 2008/0259434 A1    Oct. 23, 2008

Related U.S. Application Data

(60) Provisional application No. 60/541,908, filed on Feb. 6, 2004.

(51) Int. Cl.
*B41J 2/205* (2006.01)
(52) U.S. Cl. .......................... 347/15; 347/43; 347/100
(58) Field of Classification Search .................. 347/15, 347/43, 95–96, 98, 100
See application file for complete search history.

(56) References Cited

U.S. PATENT DOCUMENTS

| 6,058,498 | A |   | 5/2000 | Nagasaki et al. ............ 714/752 |
| 7,168,802 | B2 | * | 1/2007 | Kondo ......................... 347/100 |
| 7,399,349 | B2 | * | 7/2008 | Taguchi et al. ............ 106/31.43 |
| 7,703,907 | B2 | * | 4/2010 | Shimohara .................. 347/100 |
| 2003/0214697 | A1 |   | 11/2003 | Duthaler et al. ............. 359/296 |

* cited by examiner

*Primary Examiner*—Lamson D Nguyen
(74) *Attorney, Agent, or Firm*—Fish & Richardson P.C.

(57) ABSTRACT

A method of printing an image of a three-dimensional object includes printing multiple dots of a colored ink to form an image of the object and printing dots of a transparent ink having a refractive index greater than 1 within the image. The dots of transparent ink local alter the path length of light that shines through the image to create phase variations on the image.

18 Claims, 16 Drawing Sheets

COMPLEX POINTILLISTIC PRINTING

This application is a US national stage under 35 U.S.C. §371 of PCT/US2005/003775 filed Feb. 7, 2005, which in turn claims priority to U.S. provisional application No. 60/541,908 filed Feb. 6, 2004. These applications are herein incorporated by reference.

TECHNICAL FIELD

This disclosure relates to printing stereovision color images of three-dimensional (3D) objects onto two-dimensional surfaces and more particularly to complex pointillistic multicolor printing.

BACKGROUND

Representation of a three-dimensional ("3D") object with a two-dimensional ("2D") image is difficult is a non-trivial task. Holographic techniques have been used to create naked-eye stereovision images of 3D an object by recording the light wavefronts emitted from the object at a particular observation plane on a recording medium and the reconstructing the original light wavefronts by shining an appropriate light on the recorded medium, such that the light wavefronts appear to be emitted from the 3D object itself.

In modern optics theory, a complete description of light emitted from an object generally treats the wavefronts of light emitted from the object as complex wavefronts (i.e., having real and imaginary parts). An image of the object recorded on a recording medium, however, is generally represented by real functions of signal intensities. Therefore, the reconstruction of complex wavefronts from actual images that record only intensity data is non-trivial.

Conventional holography circumvents the problem of representing complex wavefronts with real signal intensity data by using an interference between signal and reference waves, through which the real component of complex wavefronts, $Re[\Psi(r)]$, can be extracted, where $Re[\Psi(r)]$ represents an addition of two conjugate waves, $\Psi(r)$ as $$Re[\Psi(r)] = \frac{1}{2}(\Psi(r) + \Psi*(r)).$$

Off-axis holography can extract a complex wavefront, $\Psi(r)$, responsible for stereovision from $Re[\Psi(r)]$ with the aid of a particular coherent illumination.

Other experiments using phase manipulation techniques can supplement the representation of the imaginary component of the wavefront, $Im[\Psi(r)]$. For example, the real and imaginary components of the wave function can be added in a computer image, $\Psi(r)=Re[\Psi(r)]+iIm[\Psi(r)]$, but such techniques have not been extended to physical space.

SUMMARY

Methods of printing complex functions for expressing light wavefronts and for and representing colored 3D objects have been developed. The printing methods use print that is composed of colored complex pixels ("complexels") that can control the phase, intensity, and color of light emitted from the image. To achieve a complex printing function, phase printing, which represents the phase part or complex part of complex wavefronts and is realized with high refractive transparent inks, is used to supplement conventional color printing. To print phase information about an image of an object, the phase part, $e^{i\theta(r)}$, of the complex amplitude of a wavefront, $\Psi_{conc}(r)=A(r)e^{i\theta(r)}$, of light from the image can be printed, where $A(r)$ depicts the color and intensity parts of the image or the image can be printed pointillistically using complementary phase and color/amplitude pixels, to express the complex amplitude of the wavefront, $\Psi_{point}(r)=A(r)\cos\theta(r)+iA(r)\sin\theta(r)$, where the two real functions, $A(r)|\cos\theta(r)|$ and $A(r)|\sin\theta(r)|$ depicting the color part, are printed pointillistically adjacent to each other.

In a first general aspect, a method of printing an image of a three-dimensional object includes printing multiple dots of a colored ink to form an image of the object and printing dots of a transparent ink having a refractive index greater than 1 within the image. The dots of transparent ink local alter the path length of light that shines through the image to create phase variations on the image.

Implementations can include one or more of the following features. For example, a real part of multiple complexel can be printed on a recording medium adjacent to an imaginary part of the complexel. A phase plate can be printed above the imaginary part of the complexel. Dots of the transparent ink can be printed above dots of the colored ink on a recording medium.

The image can be defined by a complex wavefront defined by $A(r)e^{i\theta(r)}=A(r)\cos\theta(r)+iA(r)\sin\theta(r)$, wherein $A(r)$ represents a two-dimensional distribution of the wavefront amplitude and $\theta(r)$ represents the two-dimensional distribution of the wavefront phase, and dots of the colored inks can be printed to represent a real part of a complexel, dots of a transparent ink can be printed over the real part of the complexel to create a $\lambda/2$ phase plate when $\cos\theta(r)$ is negative, dots of the colored inks can be printed to represent an imaginary part of the complexel, dots of a transparent ink can be printed over the imaginary part of the complexel to create a $\lambda/4$ phase plate when $\sin\theta(r)$ is positive, and dots of a transparent ink can be printed over the imaginary part of the complexel to create a $3\lambda/4$ phase plate when $\sin\theta(r)$ is negative.

A refractive index of the transparent ink can be selected to be printed to print the $\lambda/4$ phase plate, the $\lambda/2$ phase plate, and the $3\lambda/4$ phase plate. A thickness of a layer of the transparent ink can be selected to be printed to print $\lambda/4$ phase plate, the $\lambda/2$ phase plate, and the $3\lambda/4$ phase plate.

Printing dots of the colored ink and printing dots of the transparent ink can further include mixing transparent ink having a refractive index with colored ink and printing dots of the mixed ink.

Multiple dots of at least three colored inks can be printed to form an image of the object and dots of a transparent ink having a refractive index greater than 1 can be printed within the multi-color image, wherein the dots of transparent ink local alter the path length of light that shines through the image to create phase variations on the multi-color image.

The image can be printed on a transparent medium, such that the image can be illuminated from a back side of the medium and viewed form a front side of the medium. The image can be printed on a reflective medium, such that the image can be illuminated from a front side of the medium and viewed form the front side of the medium.

A layer of transparent ink can be printed that introduces a variation in the optical path length of the light emitted from the image, wherein the optical path length variation compensates for a path length differences in illumination light that deviate from plane wave wavefronts.

Multiple images can be printed on a recording medium, wherein each image includes multiple dots of a colored ink to form an image of the object and dots of a transparent ink having a refractive index greater than 1 within the image, and wherein the dots of transparent ink local alter the path length of light that shines through the image to create phase variations on the image, wherein the multiple images are printed on the film, such that they can be consecutively to create an moving image.

In another general aspect, a method of printing an optical element on a two-dimensional surface includes printing a layer of transparent ink having a refractive index greater than 1 in a pattern on the surface and controlling the local optical path length of light that travels though the transparent ink, such that the phase of light reflected by or transmitted through the ink on the surface is altered in a predetermined manner.

Implementations can include one or more of the following features. For example, the local thickness of the transparent ink can be controlled to control the local optical path length of light. The local index of refraction of the transparent ink can be controlled to control the local optical path length of light. The optical element can be a lens, a concave lens, a convex lens, a prism, a phase plate, a grating, a curved mirror, a non-spherical lens, or a zone plate.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

In modern optics theory wavefronts of light emitted from an object are be expressed by complex numbers to describe both the amplitude, wavelength, and phase of the light. Images of an object recorded on the medium, however, are generally represented by real functions of signal intensities. Thus, when recording a 2D image of a 3D object, information about the phase of the wavefronts of light emitted from the object is generally lost.

Three Dimensional Images Displayed on Two Dimensional Surfaces

Figure 1:
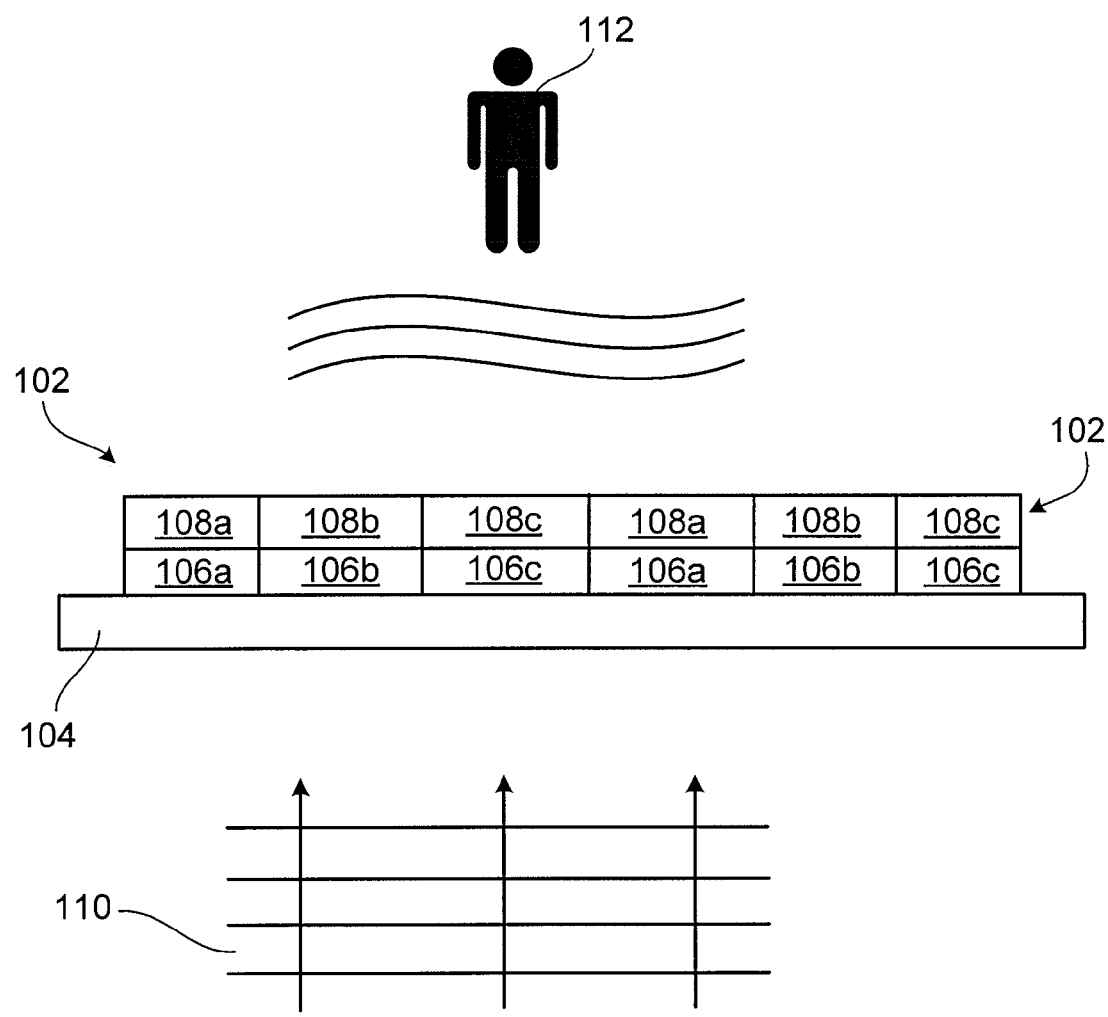
FIG. 1 is a schematic view of a complex image printed on a transparent medium being displayed to a viewer.

Referring to FIG. 1, phase, amplitude, and color information can be encoded in an 2D image of a 3D object by expressing the image in a multitude of points. Because the image is composed of a plurality of individual points, the printing of such an image can be referred to as "pointillistic" printing. Each point of the image includes a "complexel" 102 that contains a color, intensity, and phase information about that a portion of the image. For example, when the image is printed on a transparent film 104, each complexel 102 includes three regions 106a, 106b, and 106c that encode information about the red, green, and blue color of a portion of the image. Overlayed on each of the color regions 106a, 106b, and 106c are corresponding transparent phase regions 108a, 108b, and 108c that control the relative phase of light emitted each color region 106a, 106b, and 106c of the image in the direction of a viewer. For example, color regions 106a, 106b, and 106c can encode the red, green, and blue value of the complexel, and phase regions 108a, 108b, and 108c can control the phase of the light transmitted though the complexel. The color regions 106a, 106b, and 106c can be ink dots deposited on the film 104 by an ink jet printer and the corresponding phase regions 108a, 108b, and 108c can be layers of a transparent refractive index material that retard the phase of light passing through the layers by a desired amount. When an image composed of multiple complexels 102 printed on the transparent film 104 is illuminated by coherent white light 110, the image is displayed to a viewer 112. The two layers of the complexel 102 (i.e., the color layer 106 and the phase layer 108) can be realized with the successive printing of color inks and phase layers ink to create the complex color print composed of a multitude of complexels 102.

Physically, the multitude of tri-color complexels 102 printed on the film 104 include information about the red, green, and blue components of the wavefront emitted from the 3D object, $\Psi_R(r_R)$, $\Psi_G(r_G)$ and $\Psi_B(r_B)$, and contribute to a color image of the object transmitted to the viewer 112, where $\Psi_i$ is the wavefuntion of the color component, and $r_i$ is the location of the film 104. The intensity, I(r), of the image observed by the viewer 112 is given by the sum of the squares of the wavefunctions of the color components, $$I(r) = E(|\Psi_R(r_R)|^2 + |\Psi_G(r_G)|^2 + |\Psi_B(r_B)|^2) = E(A_R^2(r_R) + A_G^2(r_G) + A_B^2(r_B)), \quad (1)$$

where E is an environmental parameter that includes optical conditions, such as the spectrum of the illuminating light 110 and any effect on the light as it is transmitted from the film 104 to the viewer 112, and $A_i$ is the amplitude of the color component. The wavefunctions of each color component are given by $$\Psi_R(r_R)=A_R(r_R)\exp(i\theta_R(r_R)) \quad (2)$$

$$\Psi_G(r_G)=A_G(r_G)\exp(i\theta_G(r_G)) \quad (3)$$

$$\Psi_B(r_B)=A_B(r_B)\exp(i\theta_B(r_B)) \quad (4)$$

where $\theta_i(r_i)$ are the phase of each wavefront function.

Figure 2:
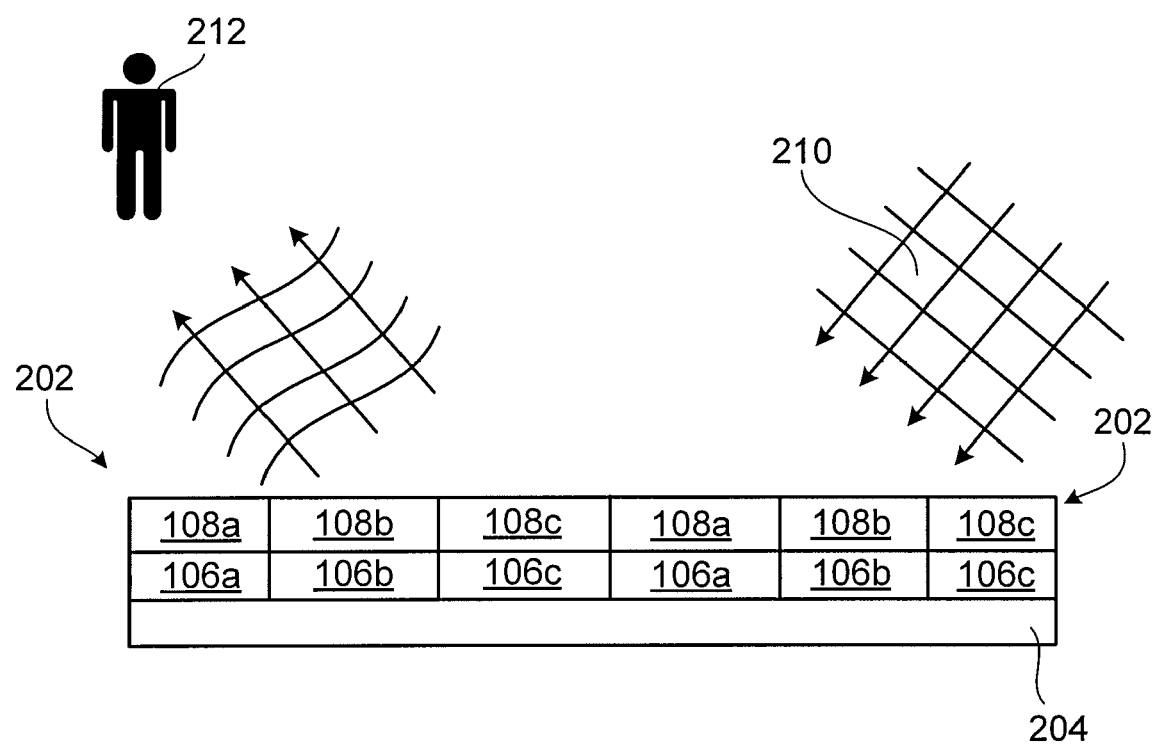
FIG. 2 is a schematic view of a complex image printed on a reflecting medium being displayed to a viewer.

As shown in FIG. 2, an image, composed of a multitude of complexels 202 can also be printed on a non-transparent sheet 204, so that an image can be viewed by reflecting incoming coherent white light 210 off the sheet 204 to a viewer 212. When the image is printed on a reflecting sheet 204, instead of using red, green, and blue colors for the color regions of the complexel 202, cyan, magenta, and yellow ("CMY") are used to form the color regions 206a, 206b, 206c, respectively, because these CMY colors subtract light color from the white light 210 that is incident on the sheet and reflected to the viewer 212 such that red, green, and blue colors are displayed to the viewer 212. Phase regions 208a, 208b, and 208c are printed above the color regions 206a, 206b, and 206c to control the phase of the light that is reflected to the viewer 212.

Figure 3:
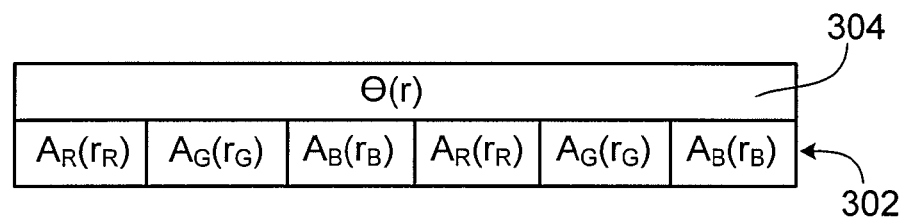
FIG. 3 is a schematic side view of two complexels formed of colored inks and an overlayed transparent ink that introduces a phase variation in the light emitted from the colored inks.

As shown in FIG. 3, when the color specificity in wavelength and optical path are ignored, the condition of strict pointillistic trichromatics can be relaxed, and conventional trichromatics can be used, in which pointillistically additive colors and concurrent subtractive colors are mixed and used with tri-colors. To express concurrent complexels with R, G and B colors, a color printing layer 302 is overlayed with phase printing layer 304 that represents the phase component of the wavefront function, $e^{i\theta(r)}$, where the phase, $\theta(r)$, is assumed to have a color-weighed average value. Because the phase, $\theta(r)$, varies continuously across the surface of the image, multiple transparent inks having different refractive indices must be prepared when dot matrix printing the phase layer 304 with a transparent inks having a fixed thickness. To print the phase layer 304 over a particular region of the color layer 302, the transparent ink having an index of refraction corresponding to the desired phase at the particular region is deposited on the color layer 302. For example, inks having 32 different indices of refraction can be deposited on the particular region of the color layer 302 to introduce a relative phase to the region. Depending on the index of refraction of the ink deposited on the region, the relative phase of the region can vary between 0 and $2\pi$ in 32 steps.

Figure 4:
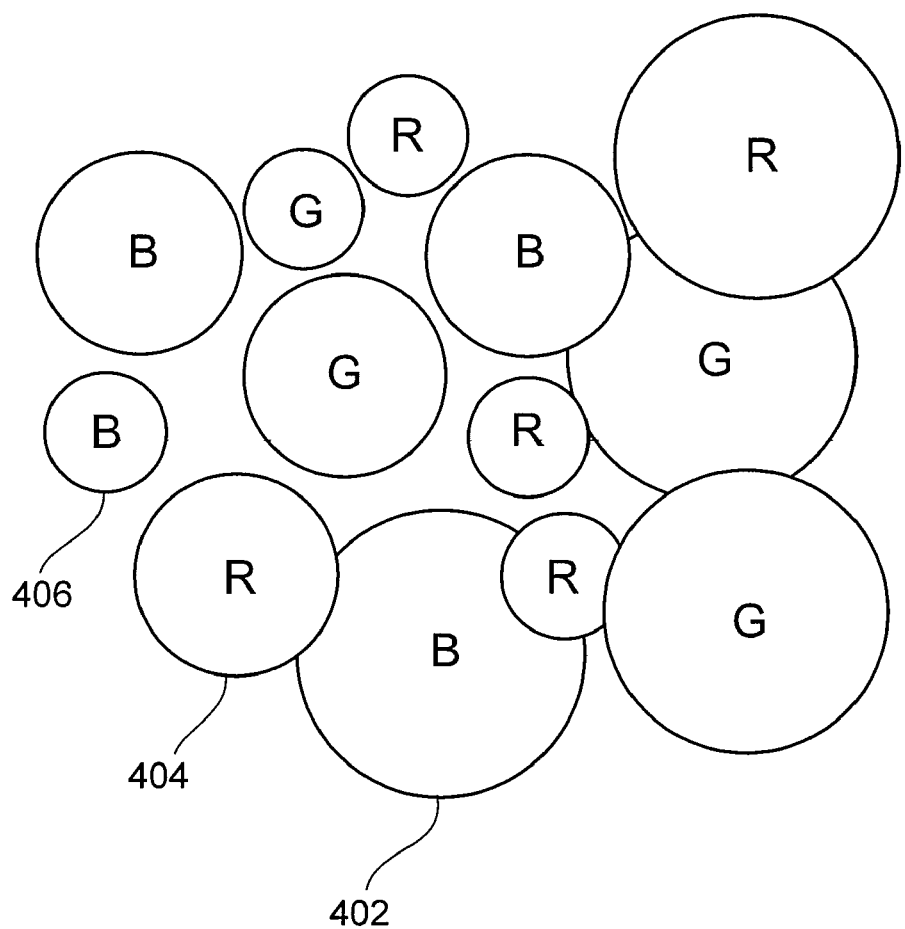
FIG. 4 is a schematic top view of multiple dots of different colored inks.

As shown in FIG. 4, when printing the color layer 302, several types of dots of different sizes and various primary colors (e.g., red, green, blue, and black or "RGBK") for transparent prints or various complementary colors (e.g., cyan, magenta, yellow, and black or "CMYK") for reflective prints can be used. For example, large dots 402, medium dots 404, and small dots 406 of the various primary or complementary colors can be used. Dots of different colors and sizes can be overlayed with each other to achieve a desired local color in the print such that an image is rendered. Black dots are used to adjust the local amplitude of the light, A(r), from the image.

RGBK inks can be used on transparent films or plates and are commonly used in back-light color displays and movies. CMYK inks can be used on opaque sheets and are commonly used photo displays and color prints. In both cases, the optical path length through the different size and color dots are substantially identical, so that the different colors and dot sizes do not introduce a relative phase. If different colors or dot sizes naturally introduce different optical path lengths, then different amounts of transparent phase inks (as discussed in more detail below) can be mixed appropriately into the different color inks and dot sizes of different colors, such that the optical path length through all colors and dot sizes is substantially identical.

Figure 5:
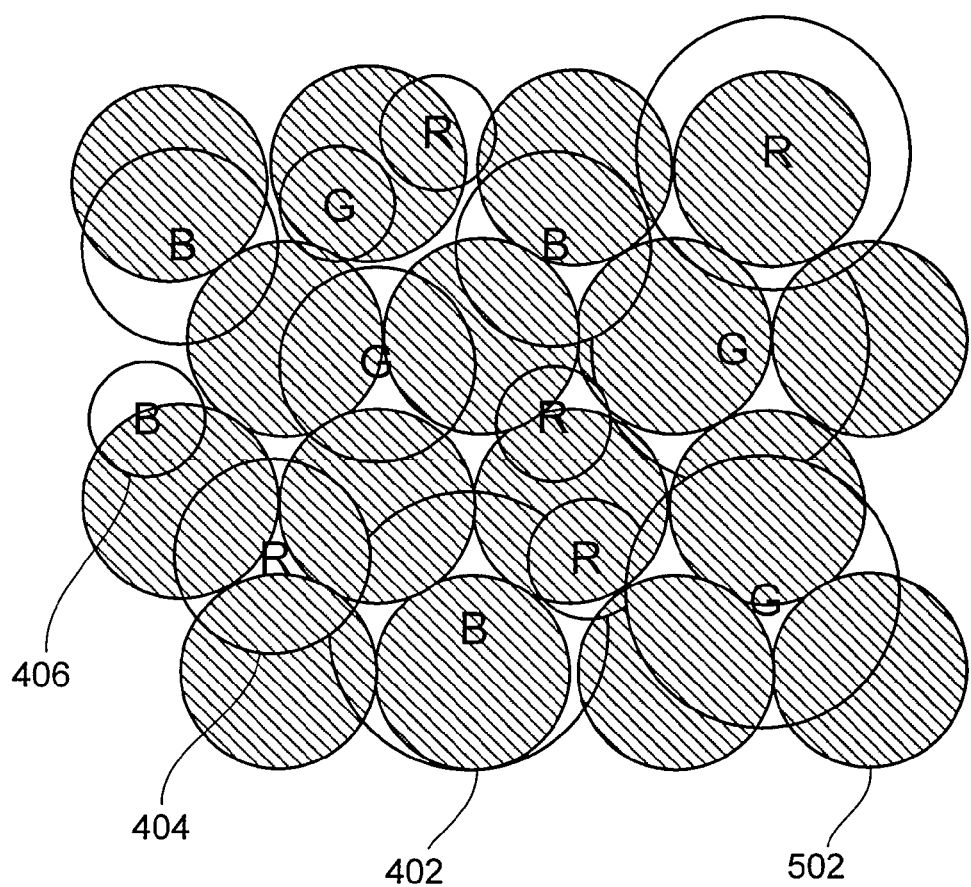
FIG. 5 is a schematic top view of multiple dots of different colored inks overlayed with dots of transparent phase ink.

As shown in FIG. 5, dots of phase ink 502, expressing the phase part, $e^{i\theta(r)}$, of the wavefront function of the image is overcoated on the colored dots that express the color part of the image. To express the local phase, $\theta(r)$, of a portion of the image at a position, r, of the image, different phase inks having different indices of refraction are printed on the color layer 302 formed of the various color dots 402, 404, and 406. The various different indices of refraction of the various inks alter the optical path length of coherent light used to illuminate the image, such that each position, r, on the image is encoded with a local phase.

Phase inks can be prepared by dissolving high refractive index polymers, such as, for example, polystyrene or inorganic materials, such as, for example, titanium oxide, into a solvent (e.g., alcohols, toluene, benzene, and hexane, and mixtures thereof). The optical path length through a dot of phase ink is determined by the index of refraction and the thickness of the dot. But using inks of different indices of refraction, different optical path lengths and therefore different relative phases can be printed. The more grayscale levels of phase inks used, the more precisely the phase of each location on the image, $\theta(r)$, can be expressed. For example, 48 to 96 different phase values can be prepared in a dot matrix printer using phase inks having different phase values.

Figure 6:
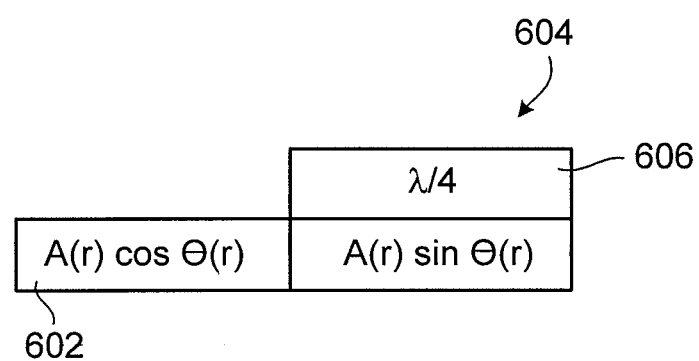
FIG. 6 is a schematic side view of a complexel representing a real and imaginary part of a complex wavefront, where the complexel is formed of colored inks and an overlayed transparent ink that acts as a phase plate to introduce a phase difference between different parts of the complexel.
Figure 7:
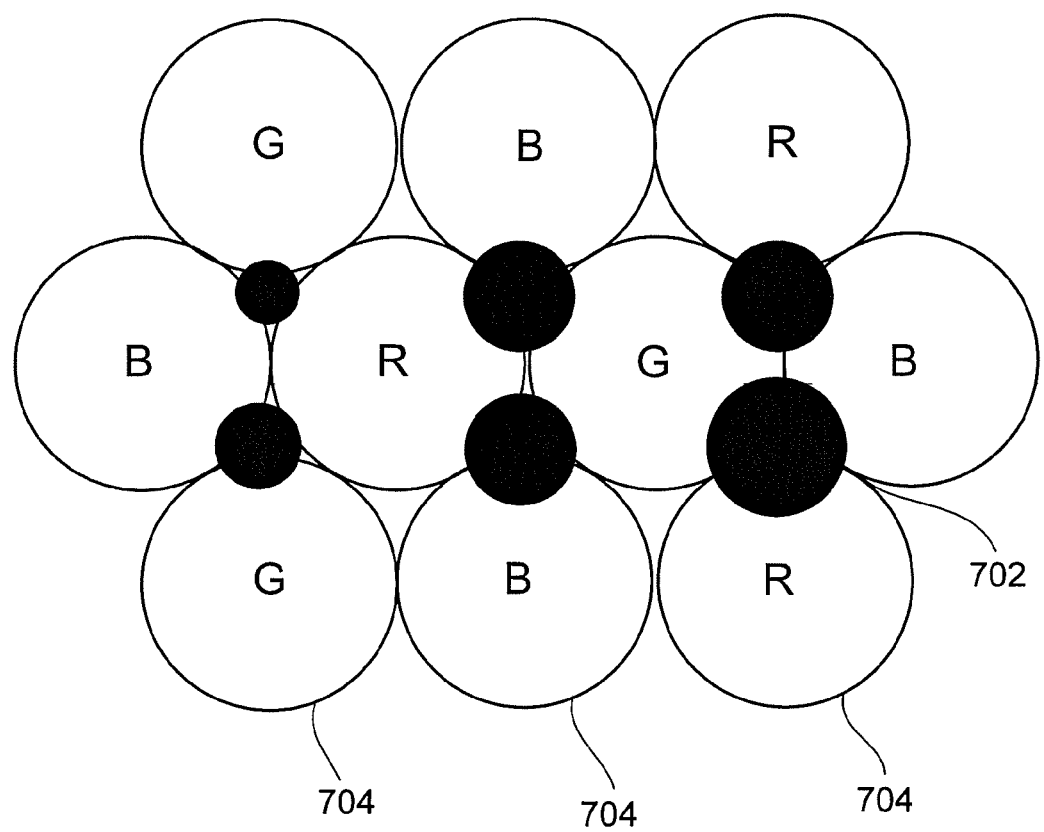
FIG. 7 is a schematic top view of multiple dots of different colored inks overlayed with dots of opaque ink.

As shown in FIG. 6, rather than printing a continuous phase layer over a color layer, the real (amplitude) component 602 and imaginary (phase) component 604 of each of the three primary color components of a complexel can be represented separately adjacent to each other. The Euler expression for a complex wavefront function, $$|\Psi(r)=A(r)e^{i\theta(r)}=A(r)\cos\theta(r)+iA(r)\sin\theta(r), \quad (5)$$

indicates that complex-valued wavefront functions can be expressed by a plurality of pointillistic complexles that are created from a pair of pixels placed side by side that represent the real part 602 (i.e., $A(r)\cos\theta$) and imaginary part 604 (i.e., $iA(r)\sin\theta(r)$) of the wavefront function at each complexel point on the image. When observed from a distance in a pointillistic color image, a particular complexel composed of a real and imaginary part can be integratively visualized as a single complex-valued pixel. As discussed above, the amplitude and color of the real and imaginary pixels 602 and 604 are created by mixing appropriate amounts of RGBK or CMYK dots. The color strength of individual dots can be controlled by controlling the hue of the color dots. As shown in FIG. 7, to control the local brightness of the image, dots of black ink 702 in varying dot sizes can be used and superposed onto color areas 704, as shown in FIG. 7.

The imaginary unit, i, attributed to the imaginary pixel 604, can be generated by a $\lambda/4$ phase plate 606, which effectively increases the phase of the imaginary pixel 604 by 90 degrees compared to the real part 602 of the complexel, where $\lambda$ is the wavelength of the primary color (red, green, or blue or cyan, magenta, or yellow) represented by the color component of the complexel. The $\lambda/4$ phase plate layer 606 can be printed with phase ink and increases the path length of light in the imaginary pixel 604 compared to the real pixel 602 as the light penetrates into the ink that forms the real and imaginary parts and is reflected back to a viewer, such that the desired phase difference is achieved between the real and imaginary pixels. To account for both positive and negative values of the sine and cosine functions in equation (5) used in the real and imaginary pixels, $$\frac{\lambda}{2} \text{ and } \frac{3}{4}\lambda$$

phase plates are necessary in addition to the λ/4 phase plate 606. For example, the difference in path lengths for real and imaginary components of red, green, and blue pixels needed to create such phase plates is shown in Table 1, where the phase ink is assumed to have an index of refraction of n=1.5.

TABLE 1

|  | $\frac{\lambda}{4}$ | $\frac{\lambda}{2}$ | $\frac{3}{4}\lambda$ |
| --- | --- | --- | --- |
| Red | 170 nm | 340 nm | 510 nm |
| Green | 140 nm | 280 nm | 420 nm |
| Blue | 110 nm | 220 nm | 330 nm |

Therefore, three kinds of transparent inks having different refractive indices for generating three kinds of phase plates, $$\frac{\lambda}{2}, \frac{\lambda}{4} \text{ and } \frac{3}{4}\lambda,$$

for each color are used to overcoat the color pixels. For the real pixel having a phase between $$-\frac{\pi}{2} \text{ and } \frac{\pi}{2}$$

no phase is used, and for the real pixel having a phase between $$\frac{\pi}{2} \text{ and } \frac{3}{2}\pi a \frac{\lambda}{2}$$

phase plate is used. For the imaginary pixel having a phase between 0 and π a $$\frac{\lambda}{4}$$

phase plate is used, and for the imaginary pixel having a phase between π and 2π a $$\frac{3}{4}\lambda$$

phase plate is used.

The phase plate dots are precisely overcoated on the color dots having an identical diameter as the phase plate dots. For example, if 20 μm diameter color dots are used, the position and the size of phase plate dots should be controlled within a precision of about 2 μm. Current actuators can easily manage this precision in positioning, but it may be demanding for current ink jets.

So that the individual complexels, and the component color and real and imaginary parts of the complexels, of a multi-complexel image are not individually resolvable but blend together in a unified image, an observer's view angle between the real and imaginary pixels, or between the different color component regions should be smaller than about 1 minute of arc. For example, when the complex prints are viewed from a distance of more than about 10 m (e.g., when an outdoor advertisement banner, a stadium display, or a large theater screen is viewed), the pixel size can be about 1 mm or larger. For color prints (e.g., photos) viewed from a distance of about 25 cm, pixel sizes of about 40 μm for concurrent complex color printing and about 20 μm for pointillistic complex color printing are adequate. Thus, the requirement of pixel sizes is twice as strict for the pointillistic complex printing shown in FIG. 3 compared with the concurrent complex printing shown in FIG. 4, but it is still much less demanding compared with the printing of holograms. Another advantage of complex prints compared with holograms is the higher efficiency in the utilization of illuminated light, three times improved minimally. This means that stereovision of complex prints becomes quite natural under the usual lighting conditions.

Furthermore, it is possible to combine the concurrent color printing technique, in which different size color dots are overlayed, with the pointillistic phase printing technique in which a limited number of phase plates are used to express real and imaginary parts of the wavefront function.

Use of Complex Printing to Create Flat Optical Elements

Figure 8A:
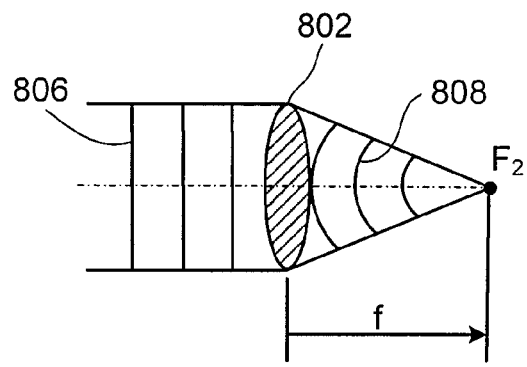
FIG. 8A and FIG. 8B are schematic side views of optical elements and their effect on light fronts.
Figure 8B:
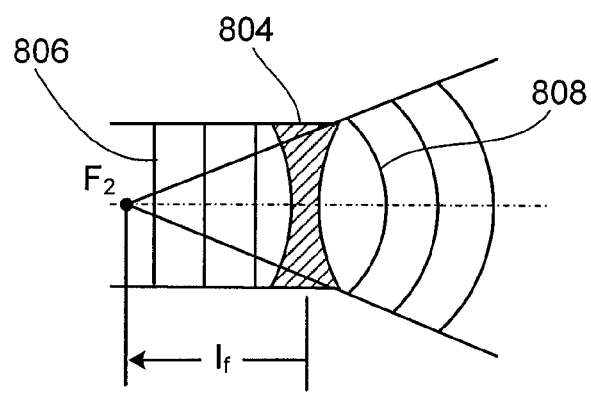

Functions of optical elements such as glasses, lenses, gratings, and prisms are generally understood as elements for converting profiles of light wavefronts. For example, as shown in FIG. 8, a convex lens 802 and a concave lens 804 can convert wavefronts from a plane wave 806 to a spherical wave 808 and from a spherical wave 808 to a plane wave 806, respectively. This wavefront conversion function is mathematically formulated with a complex function, called complex transparency, $$T_c(r) = \exp\left(-i\pi \frac{x^2 + y^2}{\lambda f}\right), \quad (6)$$

where the position (x, y) is a point on the lens 802 or 804 and f is the focal length of the lens. Equation (6) is identical to the complex function expressing Fresnel diffraction if f is replaced by the diffraction length z. This is why lenses can cancel the effect of diffractions, as discussed in more detail below.

The effect of a lens on a wavefronts can be expressed mathematically as $$\Psi_{out}(r) = T_c(r)\Psi_{in}, \quad (7)$$

where, $\Psi_{in}$ is the wavefront function before the lense and $\Psi_{out}(r)$ is the wavefront function after the lens.

Figure 9:
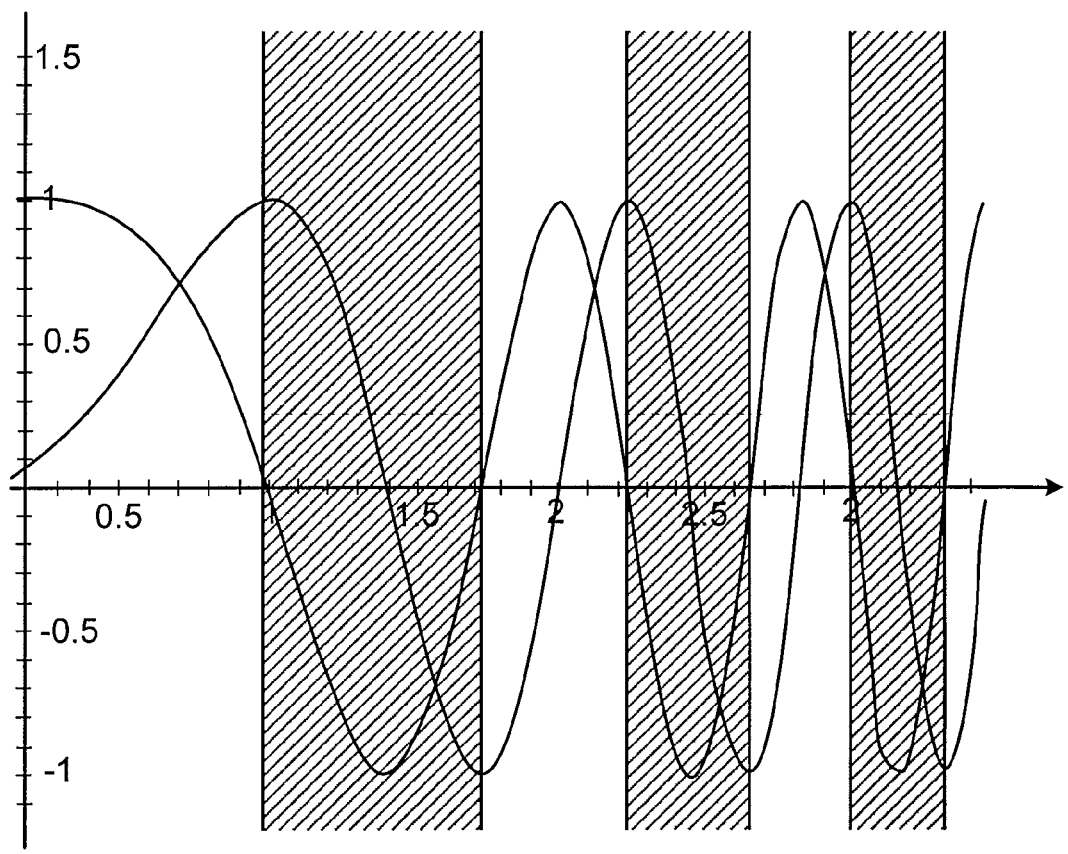
FIG. 9 is a plot of the real and imaginary component of a complex transparency function of a convex lens.
Figure 10:
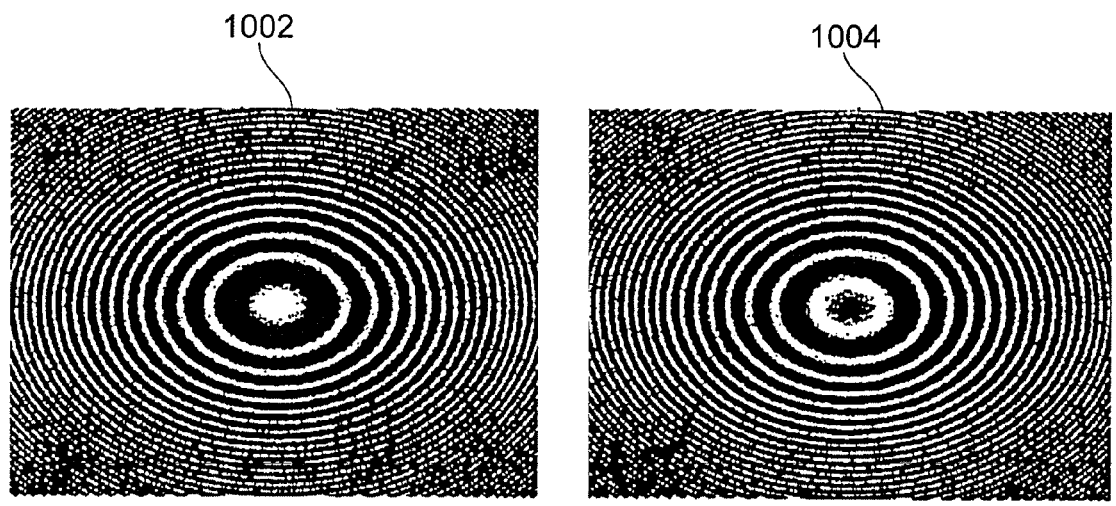
FIG. 10 is a two-dimensional plot of the real and imaginary component of a complex transparency function of a convex lens.

The complex transparency of a convex lens can be written as $$T_c(r) = \exp\left(\frac{-i\pi\gamma^2}{2}\right) = \cos\left(\frac{\pi\gamma^2}{2}\right) - i\sin\left(\frac{\pi\gamma^2}{2}\right), \quad (8)$$

$$\gamma = \sqrt{\frac{2(x^2+y^2)}{\lambda f}}, \quad (9)$$

where γ is the normalized radius measured from the center of the lens. The real component 902 and the imaginary components 904 of Eq. (8) are plotted as function of γ in FIG. 9, and the real and imaginary components 1002 and 1004 are plotted in two dimensions as functions of x and y in FIG. 10. If the real component of the transparency function, $$\cos\left(\frac{\pi}{2}\gamma^2\right),$$

is approximated by a binary function, taking only two values of 0 and 1 (i.e., opaque and transparent), a two-dimensional functional plate called a zone plate can be created of alternating opaque rings and transparent openings according to the open and shaded areas shown in FIG. 10. Zone plates have long been used as an imperfect but economical replacement of convex lenses. Zone plates illustrate that thin films carrying patterns of optical functions can replace optical elements. Zone plates binarily approximating the real part of complex transparency can also easily be fabricated, but they have various drawbacks such as low efficiency of light usage and a large background of stray light due to their imperfect reproduction of convex lenses.

Figure 11:
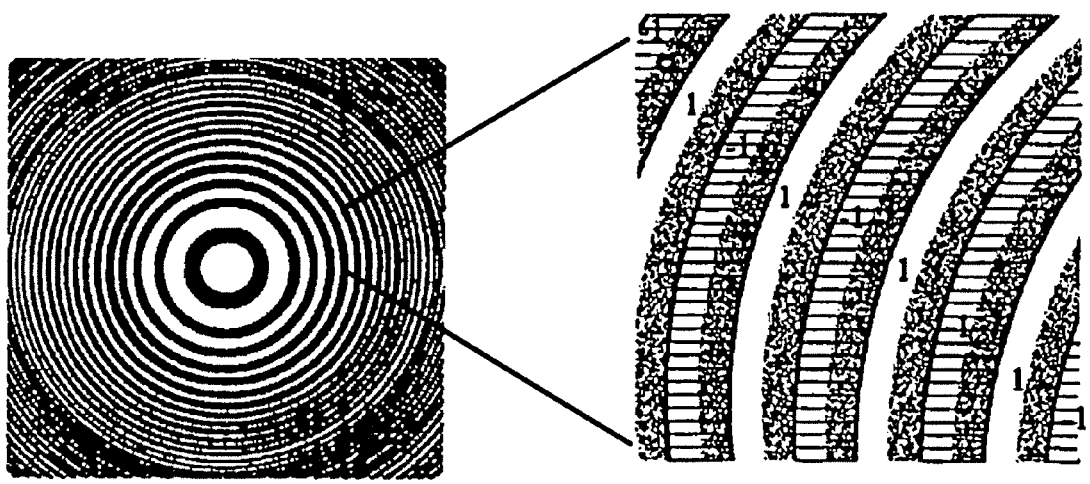
FIG. 11 is a two-dimensional plot of the real and imaginary component of a complex transparency function of a convex lens and a realization of the function on a two-dimensional medium.

However, dot printing of phase inks, as described above, can be used to reproduce the two-dimensional complex transparency function of equation (8). Thus, the transparency function of a actual optical elements can be reproduced with a high accuracy using concurrent and pointillistic phase printing. For example, a pattern expressing the Fresnel-diffraction type of function given by equation (8) is shown in FIG. 11. In FIG. 11, one possible realization of the complex transparency function is given by approximating cos θ and sin θ by a rectangular function only taking +1 and −1 alternatively according to the phase advancement of $$\frac{\pi}{2}.$$

This patterning could be easily done by putting nothing onto the part 1, a $$\frac{\lambda}{4}$$

phase plate onto the i part, a $$\frac{\lambda}{2}$$

phase plate onto the −1 part, and a $$\frac{3}{4}\lambda$$

phase plate onto the part −i shown in FIG. 11. To more precisely mimic the complex function, cos θ and sin θ can be more rigorously approximated with grayscale tones between 1 and −1 to approximate small phase variations.

As shown in this example, functions of optical elements can be imitated by printing their complex transparency functions patterns using a combination of transparent phase and tone inks. Optical elements that can be approximated with phase printing can include various convex and concave lenses, various glasses, various gratings, various prints, various mirrors, various diffusers, various reflectors, various phase plates, and various shading plates. The application of complex films can cover all imaginable optical elements, such as, for example, sophisticated astigmatic, high performance non-spherical convex or concave lenses used for microscopes, large non-spherical concave mirrors used for astronomical telescopes, and fine gratings used in semiconductor industries.

Various optical aberrations, which are usually inevitable in conventional optical devices, an also be removed although color aberration can not be removed only with tone or transparent complex films. However, the color aberration can also be removed by using complex color printing to transparent plates.

Both concurrent and pointillistic phase printing can be applied to create such optical elements. Technically demanding but higher performance printing is possible with the concurrent printing for the phase, θ(r), which is particularly important to precisely represent $e^{i\theta(r)}$. On the other hand, the pointillistic printing, which prints the function form of cos θ(r)+i sin θ(r), is less demanding than the phase printing as explained herein but requires that the tone printing be expressed as |cos θ| and |sin θ|. The tone printing has also a drawback of lessened light intensity compared with the concurrent phase printing where transparent phase inks are exclusively used.

EXAMPLES

Figure 12:
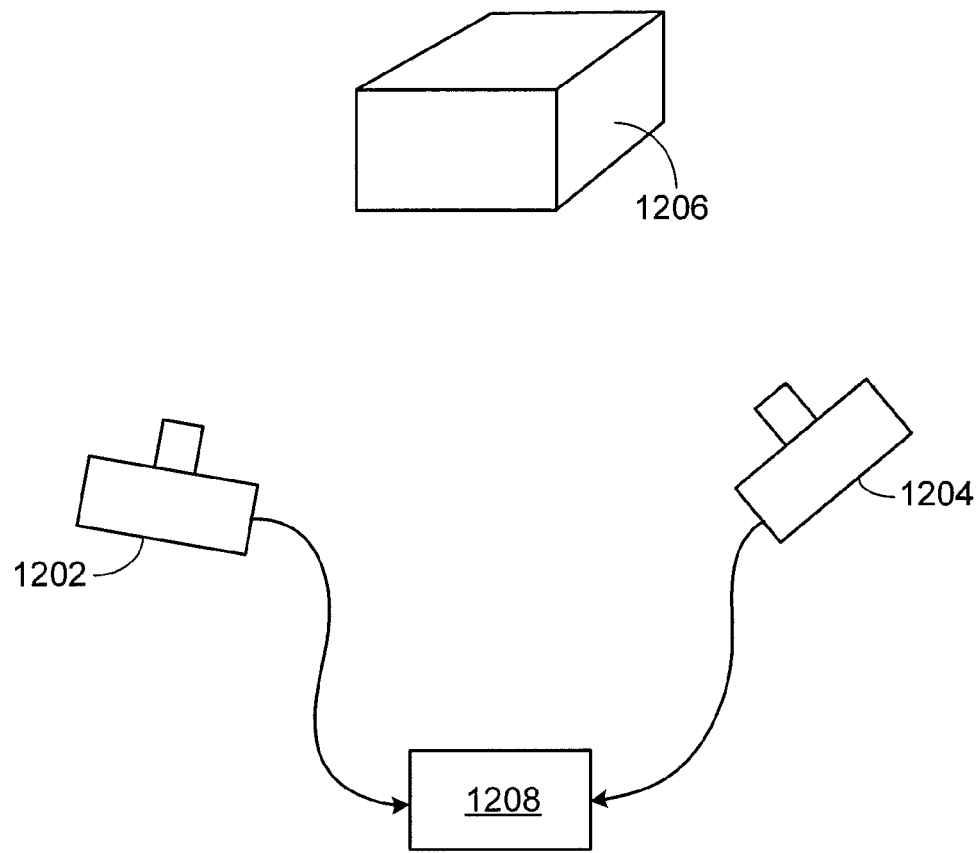
FIG. 12 is a schematic side view of an arrangement of cameras used to record data for creating a stereoscopic image.

As shown in FIG. 12, to calculate color wavefront functions (i.e., $A_R(r)e^{i\theta_R(r)}$, $A_G(r)e^{i\theta_G(r)}$ and $A_B(r)e^{i\theta_B(r)}$) for a real object 1206 two color pictures can be recorded by two cameras 1202 and 1204 that are placed side by side at a predetermined distance from each other, and then information from the images recorded by the two cameras can be use to extract phase the wavefront functions using technique commonly used in the computer-generated holography and described in A. J. MacGovern and J. C. Wyant, "Computer Generated Holograms For Testing Optical Elements, Appl. Opt. vol. 10, pp. 619-624 (1971), which is incorporated herein by reference in its entirety. Based on the information in the images recorded by the two cameras 1202 and 1204, 3D distributions of tri-colors attributed to surfaces of the object 1206 can be created in a computer 1208, such the each point on the object 1206 is characterized by six parameters (i.e., the x, y, and z coordinate and the R, G, and B color values). Based on these six dimensional data the color wavefront functions, $A(r)e^{i\theta(r)}$, can be calculated, such that the phase of the wave for each color component at the viewing screen of each camera viewing screen of a camera is given by:

$$R: \exp\left(i\frac{\pi}{\lambda_R}\frac{x^2+y^2}{f}\left(1-\frac{z}{f}\right)\right) \quad (10a)$$

$$G: \exp\left(i\frac{\pi}{\lambda_G}\frac{x^2+y^2}{f}\left(1-\frac{z}{f}\right)\right) \quad (10b)$$

$$B: \exp\left(i\frac{\pi}{\lambda_B}\frac{x^2+y^2}{f}\left(1-\frac{z}{f}\right)\right) \quad (10c)$$

where $\lambda_R$, $\lambda_G$, and $\lambda_B$ correspond to wavelengths of the individual color components, and f is the focal length of the utilized lens in a camera. When z=f, the image is formed at the focus of the camera lens and the expressions in equations 10a-10c equal 1, indicating there is no blurriness in the imaged points. When z≠f, the expressions in equations 10a-10c are complex numbers, and the imaged points are blurred. However, the blurriness is useful, because it determines the depth of the blurred point, z, which can be recovered only if the expression of wavefronts is exactly reconstructed in the complex form and optically reconstituted in a proper manner.

Figure 13:
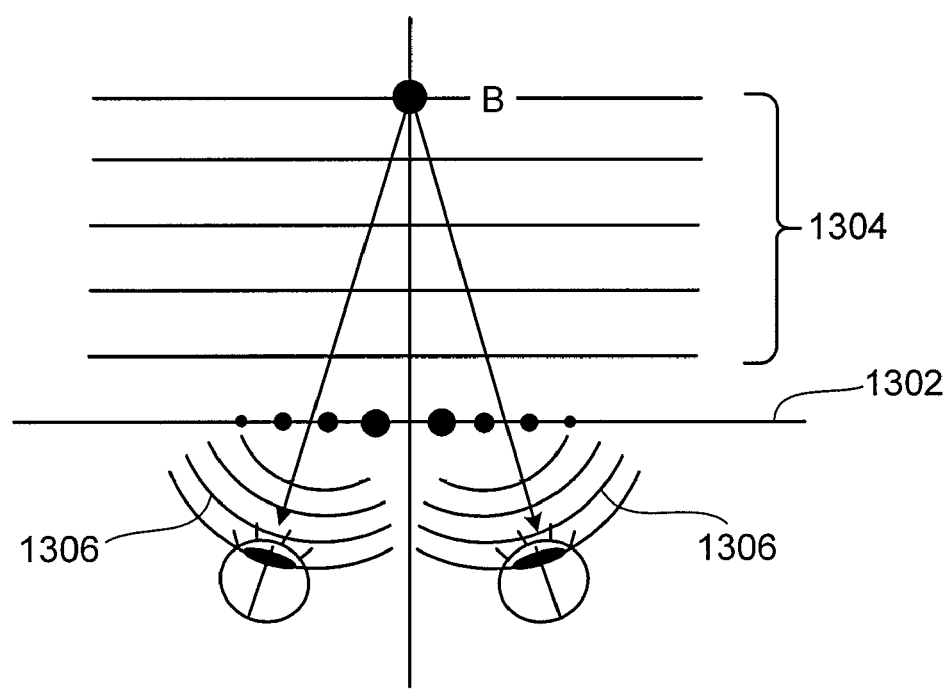
FIG. 13 is a schematic side view of diffraction of a plane wave by a complex film.

When the real part of the complex function given by equations 10a-10c is converted to a binary function, it becomes a zone plate, as explained above. Although the function of the zone plate and a lens are not identical, the zone plate provides a decent approximation of the function of the lens. Fresnel-diffraction type of functions given in the complex form, on the other hand, theoretically provide perfect renditions of the complex transparency function of an optical element, but the perfect rendition can only be realized when the film carrying the rendition of the transparency function is illuminated in a proper manner. For example, as shown in FIG. 13, for the Fresnel diffraction function spread on a film 1302 to reproduce the same wavefront as emitted from the point B, the illumination light must have a spatial coherence. Such a coherence can be provided by illumination with a coherent plane wave 1304.

When a plane wave 1304 hits the complex film 1302, the film 1302 emits a wavefront having the functional form of Fresnel diffraction. This conversion of the wave from an incident plane wave 1304 before the complex film 1302 form to the diffracted wave 1306 after the film is analogous to the conversion of a plane wave to a spherical wave by a concave lens. Thus, not only the pattern on the complex film 1302, but also the particular illumination of the film determines the image viewed by the observer.

Figure 14:
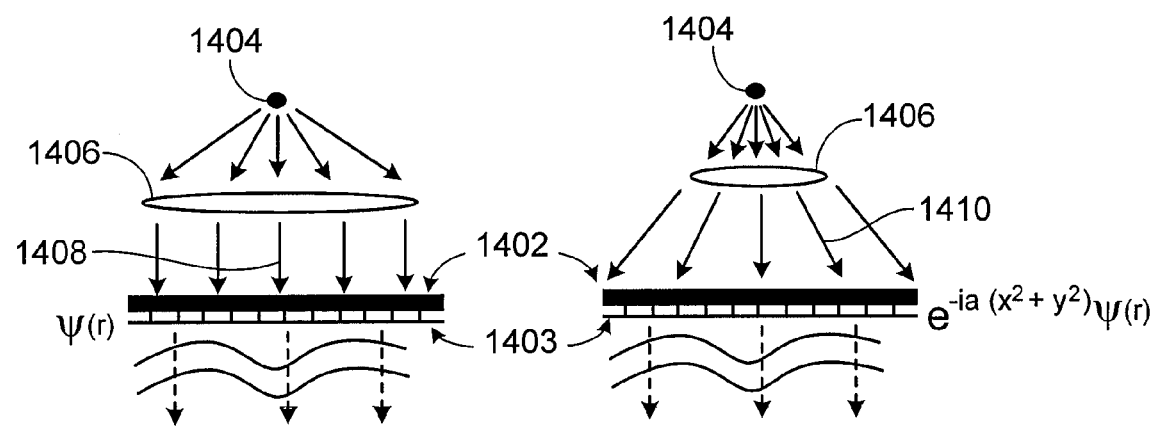
FIG. 14 is a schematic side view of diffraction of a plane wave by a complex film and of diffraction of an expanding wave by a complex film.

As shown in FIG. 14, pointillistic color and phase printing on a transparent film, as described herein, can be used to make a complex film 1402. The reproduction of stereo-images from a film printed with a complex pattern having a color part 1402 and a phase part 1403 can be achieved with coherent white light illumination of the back-side of the film 1402. If the film is not large, a parallel illumination can be achieved by shining light from a point source 1404 located at the focal point of a converging lens 1406 onto the lens 1406 to create a plane wave illumination 1408 of the complex film 1402. For a large film, the light source 1404 is not located at the focal point of the converging lens 1406, such that the complex film 1402 is illuminated with expanding wavefronts of light 1410. To cancel phase change due to the spread of the illumination light ($e^{ia(x^2+y^2)}$), a complex transparency having a function form $e^{-ia(x^2+y^2)}$, is added to the film 1402 in addition to the complex pattern, $\Psi_t(r)$, on the film.

Figure 15:
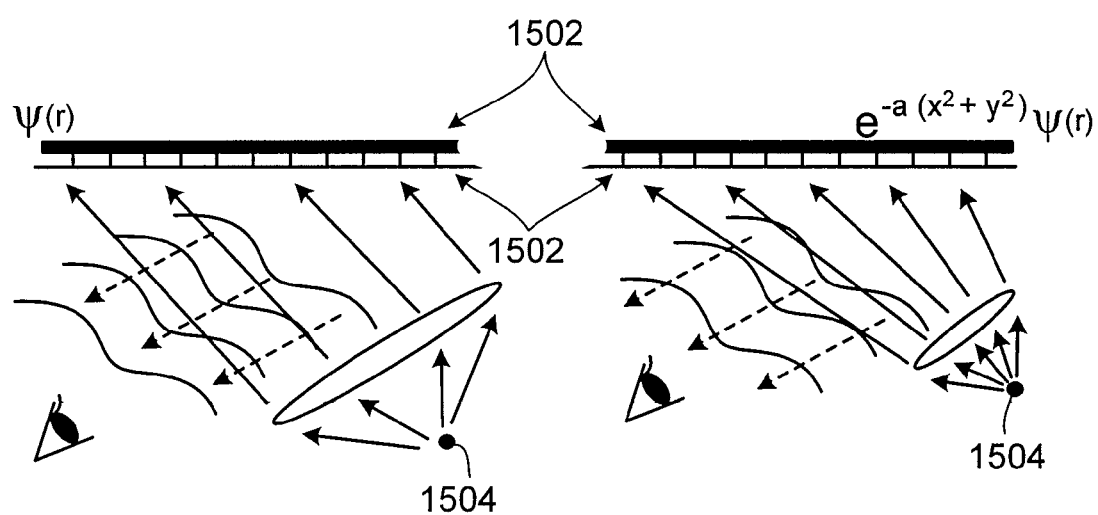
FIG. 15 is a schematic side view of a complex film for reflecting an image to a viewer.

As shown in FIG. 15, for making complex prints (e.g., photo prints), a complex pattern 1502 can be printed on a opaque sheet 1500 using either concurrent or pointillistic complex printing, as described above. Reproduction of stereo-images from the complex pattern 1502 is achieved by shining coherent white light illuminated from the front-side of the sheet 1500 and reflecting the light to the observer. For example, a point source 1504 can be collimated with a converging lens 1504 and directed toward the pattern on the opaque sheet, from which the light is reflected to the observer. For large films, a lens system making a spread light is can be used if a pattern having a complex reflectance sufficient to cancel the spread of the illumination light is printed to the sheet on the sheet 1500.

Referring again to FIG. 14, images formed from complex patterns 1402 on a transparent film can be projected as stereo-images to distant locations. For example, the image can be projected to an observer located much farther from the transparent film than the illumination source is located. Alternatively, the image can be projected to a mirror and then reflected to a distant observer. In this manner, using manner images can be projected successively to many observers, for example, to project a movie to an audience in a theater.

Figure 16:
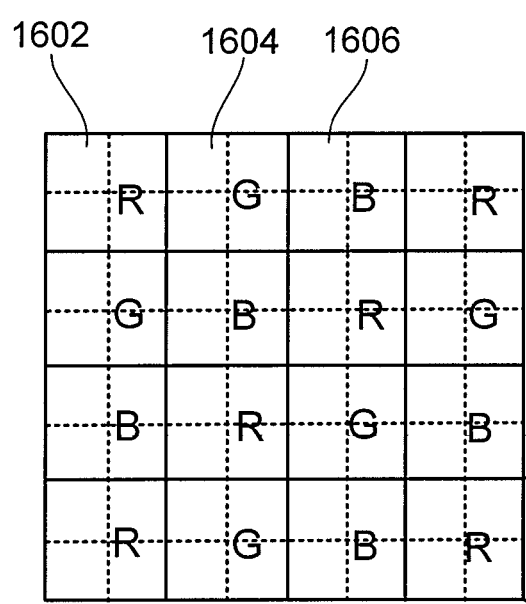
FIG. 16 is a schematic view of an electronic display screen composed of multiple light sources.
Figure 17:
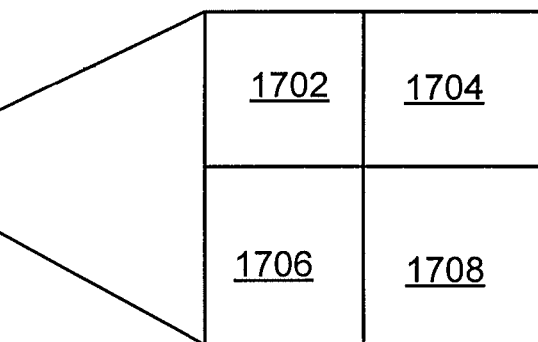
FIG. 17 is a schematic view of a light source used in the electronic display screen of FIG. 16.

Another application of the complex patterns formed on a transparent film is the color filter used for electronic displays (e.g., televisions, cell phone, and other computer generated displays) that use electronic pixels to create an image. In this application, because the locations of color pixels are fixed in location, a pointillistic compexel must be extended to include four pixels. As shown in FIG. 16, an electronic display screen can be composed of multiple light sources (e.g., light emitting diodes or liquid crystals ("LC")) that can be illuminated to display red, green, and blue light 1602, 1604, and 1606, respectively. As shown in FIG. 17, each light source is actually composed of four regions 1702, 1704, 1706, and 1708 that can be independently activated, over which transparent spatial light modulators can be placed to introduce a shift in the path length of the light of 0 λ/4, λ/2, and 3λ/4, respectively. The spatial light modulator can be a thin film of phase ink to introduce a path length difference. Thus, the real and imaginary parts of the wavefront function can be controlled according to equation (5), and the intensity of the real and imaginary parts of the local wavefront function can be controlled by adjusting the current supplied to the color element.

Figure 18:
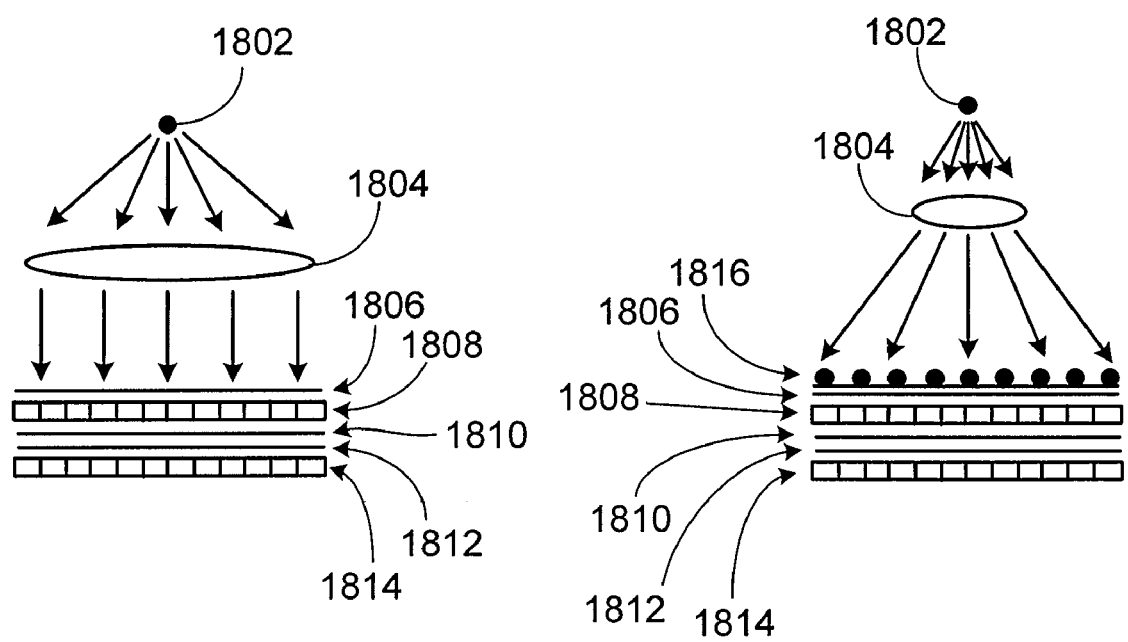
FIG. 18 is a schematic side view of and arrangement of a complex image used in an electronic display.

When LC devices are used as light modulators, phases changes introduced by a change in the light intensity must be compensated for. To cancel the phase variation coupled to the intensity variation in an LC, two LCs can be used—one for color intensity control together with color filters and another for phase cancellation. The setup of two LC layers is shown in FIG. 18. Coherent white light from a point source 1802 can collimated with a converging lens 1804 for a small pattern or spread out with a lens 1804 for a large pattern and directed toward a polarizing layer 1806 for polarizing the light to be used with the LC layers. After passing through the polarizing layer 1806, the light strikes a first LC layer 1808 that is used for intensity control of the image, an analyzer 1810, a color filter layer 1812, and a second LC layer 1814 that is used to cancel intensity-induced phase changes. The input light can be additionally collimated with an array of mircolenses 1816 for collimating the light in the direction of the LC elements.

A number of implementations have been described. Nevertheless, it will be understood that various modifications may be made. For example, although implementations have been described in which macroscopic 3D objects are reproduced with 2D images by taking account of the intensity, color, and phase of the wavefront function of light emitted from the object, other objects that affect the phase of the emitted light by their surface characteristics can also be reproduced with the techniques described herein. For example, the shimmering surfaces of pearls, shells, and iridescent blue color of wings of the Blue Morpho butterfly, which is due to microscopic patterns on the surfaces that affects the phase of light reflected from the surface, can also be reproduced with the techniques described herein. Accordingly, other implementations are within the scope of the following claims.

What is claimed is:

1. A method of printing an image of a three-dimensional object, the method comprising:
   printing multiple dots of a colored ink to form an image of the object; and
   printing dots of a transparent ink having a refractive index greater than 1 within the image, wherein the dots of transparent ink local alter the path length of light that is emitted from the image to create phase variations on the image.

2. The method of claim 1, further comprising printing a real part of multiple complexel adjacent an imaginary part of the complexel on a recording medium.

3. The method of claim 1, further comprising printing a phase plate above the imaginary part of the complexel.

4. The method of claim 1, further comprising printing dots of the transparent ink above dots of the colored ink on a recording medium.

5. The method of claim 1, wherein the image is defined by a complex wavefront defined by $A(r)e^{i\theta(r)}=A(r)\cos\theta(r)+iA(r)\sin\theta(r)$, wherein $A(r)$ represents a two-dimensional distribution of the wavefront amplitude and $\theta(r)$ represents the two-dimensional distribution of the wavefront phase, and further comprising printing dots of the colored inks to represent a real part of a complexel;
   printing dots of a transparent ink over the real part of the complexel to create a $\lambda/2$ phase plate when $\cos\theta(r)$ is negative;
   printing dots of the colored inks to represent an imaginary part of the complexel;
   printing dots of a transparent ink over the imaginary part of the complexel to create a $\lambda/4$ phase plate when $\sin\theta(r)$ is positive; and
   printing dots of a transparent ink over the imaginary part of the complexel to create a $3\lambda/4$ phase plate when $\sin\theta(r)$ is negative.

6. The method of claim 5, further comprising selecting a refractive index of the transparent ink to be printed to print the $\lambda/4$ phase plate, the $\lambda/2$ phase plate, and the $3\lambda/4$ phase plate.

7. The method of claim 5, further comprising selecting a thickness of a layer of the transparent ink to be printed to print $\lambda/4$ phase plate, the $\lambda/2$ phase plate, and the $3\lambda/4$ phase plate.

8. The method of claim 1, wherein printing dots of the colored ink and printing dots of the transparent ink further comprises mixing transparent ink having a refractive index with colored ink and printing dots of the mixed ink.

9. The method of claim 1, further comprising:
   printing multiple dots of at least three colored inks to form an image of the object; and
   printing dots of a transparent ink having a refractive index greater than 1 within the multi-color image, wherein the dots of transparent ink local alter the path length of light that shines through the image to create phase variations on the multi-color image.

10. The method of claim 1, wherein the image is printed on a transparent medium, such that the image can be illuminated from a back side of the medium and viewed form a front side of the medium.

11. The method of claim 1, wherein the image is printed on a reflective medium, such that the image can be illuminated from a front side of the medium and viewed form the front side of the medium.

12. The method of claim 1, further comprising printing a layer of transparent ink that introduces a variation in the optical path length of the light emitted from the image, wherein the optical path length variation compensates for a path length differences in illumination light that deviate from plane wave wavefronts.

13. The method of claim 1, further comprising
   printing multiple images on a recording medium, each image including multiple dots of a colored ink to form an image of the object, and dots of a transparent ink having a refractive index greater than 1 within the image, wherein the dots of transparent ink local alter the path length of light that shines through the image to create phase variations on the image, wherein the multiple images are printed on the film, such that they can be consecutively to create an moving image.

14. A method of printing an optical element on a two-dimensional surface, the method comprising:
   printing a layer of transparent ink having a refractive index greater than 1 in a pattern on the surface; and
   controlling the local optical path length of light that travels though the transparent ink, such that the phase of light reflected by or transmitted through the ink on the surface is altered in a predetermined manner.

15. The method of claim 14, further comprising controlling the local thickness of the transparent ink to control the local optical path length of light.

16. The method of claim 15, further comprising controlling the local index of refraction of the transparent ink to control the local optical path length of light.

17. The method of claim 14, wherein the optical element is a lens.

18. The method of claim 14, wherein the optical element is selected from the group consisting, a concave lens, a convex lens, a prism, a phase plate, a grating, a curved mirror, a non-spherical lens, and a zone plate.

* * * * *

UNITED STATES PATENT AND TRADEMARK OFFICE
CERTIFICATE OF CORRECTION

PATENT NO.       : 7,806,499 B2                                Page 1 of 1
APPLICATION NO.  : 10/586750
DATED            : October 5, 2010
INVENTOR(S)      : Kuniaki Nagayama It is certified that error appears in the above-identified patent and that said Letters Patent is hereby corrected as shown below:

In Column 13, line 26-43, in claim 5, delete "The method of claim 1, wherein the image is defined by a complex wavefront defined by $A(r)e^{i\theta(r)}=A(r)\cos\theta(r)+iA(r)\sin\theta(r)$, wherein $A(r)$ represents a two-dimensional distribution of the wavefront amplitude and $\theta(r)$ represents the two-dimensional distribution of the wavefront phase, and further comprising printing dots of the colored inks to represent a real part of a complexel;
printing dots of a transparent ink over the real part of the complexel to create a $\lambda/2$ phase plate when $\cos\theta(r)$ is negative;
printing dots of the colored inks to represent an imaginary part of the complexel;
printing dots of a transparent ink over the imaginary part of the complexel to create a $\lambda/4$ phase plate when $\sin\theta(r)$ is positive; and
printing dots of a transparent ink over the imaginary part of the complexel to create a $3\lambda/4$ phase plate when $\sin\theta(r)$ is negative."
and insert -- The method of claim 1, wherein the image is defined by a complex wavefront defined by $A(r)e^{i\theta(r)}=A(r)\cos\theta(r)+iA(r)\sin\theta(r)$, wherein $A(r)$ represents a two-dimensional distribution of the wavefront amplitude and $\theta(r)$ represents the two-dimensional distribution of the wavefront phase, and further comprising:
printing dots of the colored inks to represent a real part of a complexel;
printing dots of a transparent ink over the real part of the complexel to create a $\lambda/2$ phase plate when $\cos\theta(r)$ is negative;
printing dots of the colored inks to represent an imaginary part of the complexel;
printing dots of a transparent ink over the imaginary part of the complexel to create a $\lambda/4$ phase plate when $\sin\theta(r)$ is positive; and
printing dots of a transparent ink over the imaginary part of the complexel to create a $3\lambda/4$ phase plate when $\sin\theta(r)$ is negative. --, therefor.

In Column 14, line 23, in Claim 13, after "comprising" insert -- : --.

Signed and Sealed this
Eleventh Day of January, 2011

David J. Kappos
*Director of the United States Patent and Trademark Office*